United States Patent [19]

McDonald et al.

[11] Patent Number: 5,647,812
[45] Date of Patent: Jul. 15, 1997

[54] COIL SPRING CHAIN TENSIONER

[75] Inventors: Randy McDonald, Ithaca, N.Y.; Tom Hanlon, Clayton, Ind.

[73] Assignee: Borg-Warner Automotive, Inc., Sterling Heights, Mich.

[21] Appl. No.: 565,443

[22] Filed: Nov. 30, 1995

[51] Int. Cl.[6] ........................................................ F16H 7/08
[52] U.S. Cl. ........................................................ 474/111
[58] Field of Search ................................... 474/101, 109, 474/111, 135, 273, 5, 75

[56] References Cited

U.S. PATENT DOCUMENTS

| | | | |
|---|---|---|---|
| 2,963,918 | 12/1960 | Blakstad | 474/111 |
| 3,148,555 | 9/1964 | Peras | 474/111 |
| 5,055,088 | 10/1991 | Cradduck et al. | 474/135 |
| 5,277,667 | 1/1994 | Gardner et al. | 474/135 |

OTHER PUBLICATIONS

Buick 3800 Coil Spring Tensioner.
Thirteen pages of drawings containing proprietary material, dated 1988–1992.

Primary Examiner—Tamara L. Graysay
Assistant Examiner—Gary Hartmann
Attorney, Agent, or Firm—Hugh A. Abrams, Esq.; Greg Dziegielewski, Esq.

[57] ABSTRACT

A chain tensioner having a shoe, a coil spring, and a bushing disposed through the coils of the spring. The shoe has a chain wear surface and a spring wear surface. The coil spring has a coiled section and two legs extending away from the coiled section which contact the spring wear surface of the shoe. The legs of the coil spring impart a spring force on the shoe and cause the shoe to tension a chain.

16 Claims, 4 Drawing Sheets

COIL SPRING CHAIN TENSIONER

BACKGROUND OF THE INVENTION

This invention relates to tensioners used with chain drives in automotive timing applications and more particularly to a coil spring chain tensioner.

Tensioning devices are used as a control device for a power transmission chain, or any similar power transmission devices, as the chain travels between a plurality of sprockets. Generally, it is important to impart and maintain a certain degree of tension to the chain to prevent noises or slippage. Prevention of such slippage is especially important in the case of a chain driven camshaft in an internal combustion engine because slippage will throw off the camshaft timing by several degrees, possibly rendering the engine inoperative or causing damage. However, in the harsh environment in which an internal combustion engine operates, chain tension can vary between excessively high or low levels as a result of the wide variations in temperatures and differences between the coefficients of linear expansion among the various parts of the engine, including the chain and the tensioner. Moreover, wear to the chain components, during prolonged use, can result in a decrease in the tension of the chain. In addition, cam shaft and crank shaft induced torsional vibrations cause chain tension to vary considerably. This tension variation results in chain elongation, determined by chain stiffness.

There are several types of chain tensioners which can be used to tension a chain. Two common types of chain tensioners are blade-type chain tensioners and coil spring chain tensioners.

Generally, blade-type chain tensioners utilize a blade spring interlocked under tension with a shoe to provide tension to a chain. Specifically, the blade spring is arcuate in shape and the shoe is relatively flat. The shoe is further constructed from a material that will deform or "creep" upon experiencing a load at a high temperature. The blade spring is bent to correspond to the shape of the shoe and interlocked therewith. Through the bias of the blade spring, which wishes to return to its original, more arcuate shape, a load is applied to the shoe. Thus, as the operation of the engine causes the temperature of the shoe to increase, the load from the blade spring causes the shoe to deform to a more arcuate shape. Through such deformation, tension is provided to a chain. Specifically, the blade assembly is positioned relative to the chain so that as the shoe becomes more arcuate it bears upon a span of chain and increases chain tension.

There are several disadvantages with using a blade-type chain tensioner to tension a chain. For instance, blade-type chain tensioners are generally not very compact in size. Thus, blade-type chain tensioners may not be used in some applications with tight space requirements. In addition, blade springs can only bias a shoe a short distance. Therefore, blade-type chain tensioners cannot exert a very high tension force on the chain.

Coil spring chain tensioners overcome some of the disadvantages of blade-type chain tensioners. Instead of using a blade spring to bias the shoe, coil spring chain tensioners use the ends of a coil spring to bias the shoe. Coil springs are capable of biasing a shoe a greater distance than that of a blade spring. Therefore, coil spring chain tensioners can exert a greater tension force on a chain than the blade-type chain tensioners. In addition, coil spring chain tensioners can be compact in size.

An example of a coil spring chain tensioner is the Buick 3800 Coil Spring Tensioner ("3800 Tensioner"), which is manufactured by the assignee of this invention. The 3800 Tensioner has a tensioning shoe pivotally mounted between one end of outer and inner brackets with a pivot pin. The other end of the outer and inner brackets is pivotally mounted to a fixed bushing.

In order to impart a force on the shoe, a coil spring having first and second elongated ends is wound about the bushing. The first elongated end extends from the coil spring in a direction perpendicular to the bushing and contacts the shoe. The second elongated end extends from the coil spring in a direction parallel to the bushing and is fixed relative to the bushing. Since the second elongated end is fixed, the first elongated end imparts a rotational spring force on the shoe as the coil spring tries to unwind.

In the present invention, however, both ends of the coil spring are used to bias the shoe and tension the chain. Thus, the coil spring imparts a translational spring force on the shoe and biases the shoe in a direction perpendicular to the windings of the coil spring. As a result, the coil spring is capable of biasing the shoe a greater distance than the 3800 Tensioner for a given amount of spring force. Moreover, the present invention has only three basic elements and does not include pivot pins or inner and outer brackets to attach the shoe to the bushing.

Accordingly, it is an object of the present invention to provide a coil spring chain tensioner which is an improvement over the prior art coil spring chain tensioners and overcomes the previously mentioned disadvantages associated with a blade-type chain tensioner.

SUMMARY OF THE INVENTION

The present invention provides a coil spring chain tensioner having a shoe, a coil spring, and a bushing disposed through the coils of the spring. The shoe has a chain wear surface and a spring wear surface. The coil spring has a coiled section and two legs that extend away from the coiled section and contact the spring wear surface of the shoe. The legs impart a spring force on the shoe and cause the shoe to tension a chain.

One embodiment of the present invention provides a chain tensioner having an elongated shoe with first and second end sections, a coil spring, and a bushing disposed through the coils of the spring. The shoe has a chain wear surface and a spring wear surface. The coil spring has a coiled section and two legs that extend away from the coiled section and contact the spring wear surface of the first end section. The legs impart a spring force on the first end section of the shoe and cause the shoe to tension a chain. A fixed fastener may be disposed through a bore in the second end section to pivotally mount the second end of the shoe.

Alternatively, a second coil spring and bushing may be provided for the second end section of the shoe. The second coil spring has a coiled section and two legs that extend away from the coiled section and contact the spring wear surface of the second end section. Consequently, in this embodiment, the legs of both the first and second coil springs impart a spring force on the respective end sections of the shoe and cause the shoe to tension a chain.

Another embodiment provides a chain tensioner having a shoe, a coil spring, and a bushing disposed through the coils of the spring. The shoe has a chain wear surface, a spring wear surface, and a vertical guide slot perpendicularly oriented between the spring wear surface and the chain wear surface. The vertical guide slot is adapted to slidably receive a fixed guide pin that restricts movement of the shoe. The coil spring has a coiled section and two legs that extend away from the coiled section and contact the spring wear surface of the shoe. The legs of the coil spring impart a spring force on the shoe and cause the shoe to tension a chain.

DETAILED DESCRIPTION OF THE PREFERRED EMBODIMENTS

Figure 1:
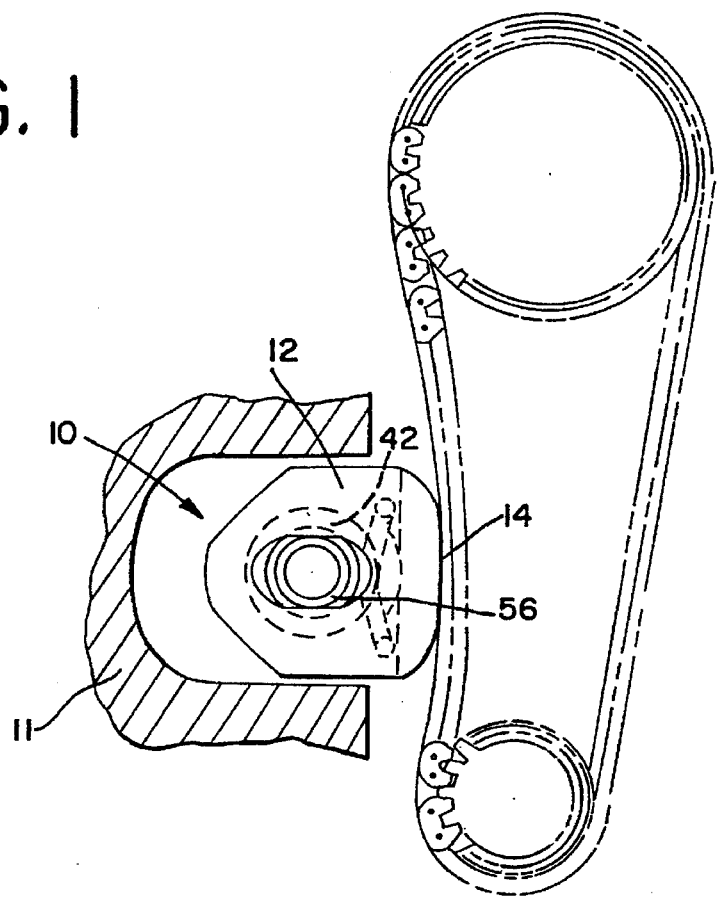
FIG. 1 is a side view of a preferred embodiment of the coil spring chain tensioner of the present invention acting on a chain.

Turning now to the drawings, FIG. 1 depicts the preferred embodiment of the present invention used to tension a chain. The chain tensioner 10 is positioned close to the chain that needs to be tensioned. As the chain begins to loosen, the shoe 12 exerts a force on the chain to tension the chain.

As shown in FIG. 1, a housing 11 may be provided to prevent rotational movement of the chain tensioner 10. Of course it is understood by one skilled in the art that any arrangement suitable for restricting the rotational movement of the shoe may be used. For example, but without being limited, pins or fasteners may be provided on one or both sides of the shoe.

Figure 2:
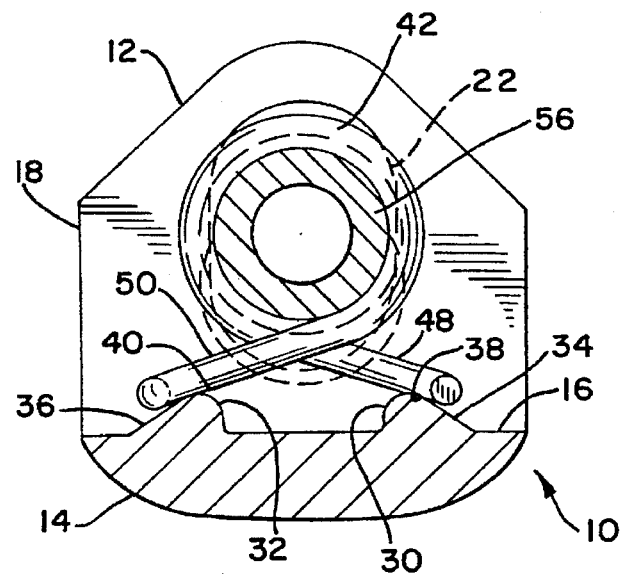
FIG. 2 is a side sectional view of the coil spring chain tensioner of FIG. 1.

The chain tensioner 10 of the present invention comprises a shoe 12, a coil spring 42, and a bushing 56. The shoe 12 has a chain wear surface 14 on that part of the shoe which comes into contact with the chain to be tensioned. Preferably, the chain wear surface is rounded to promote chain travel even as the chain is tensioned. As shown in FIG. 2, the shoe also has a spring wear surface 16 opposite the chain wear surface 14.

Any durable wear resistant material may be used for the shoe. A synthetic material, such as nylon, which has high wearability and durability characteristics can be used. In particular, Nylon 6/6 is one commercially available material that may be used. In addition, the shoe may also be made of PEEK (polyester ethylene ketone), which also has high wearability and durability characteristics.

Figure 3:
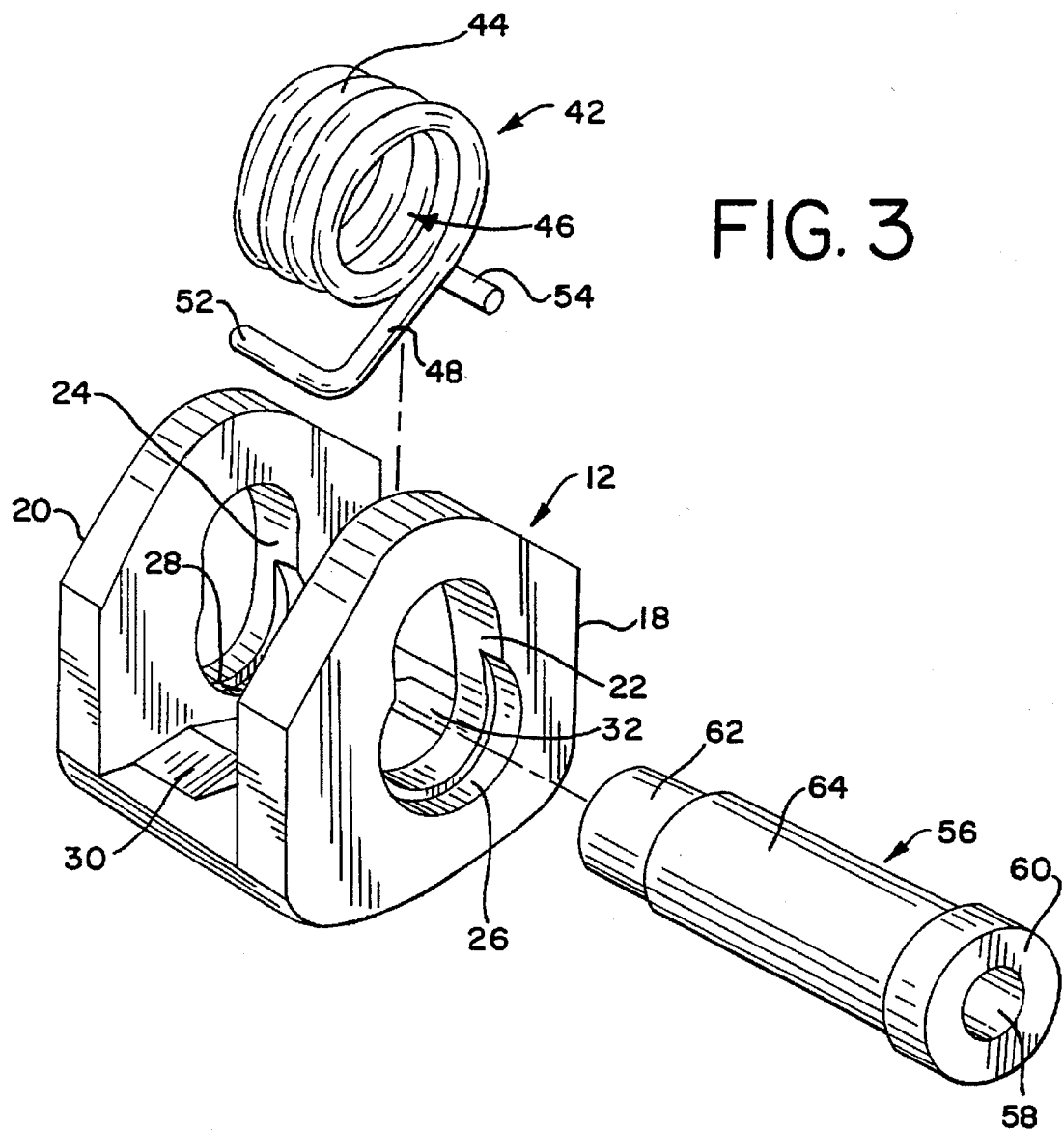
FIG. 3 is an exploded view of the coil spring chain tensioner of FIG. 1.

As seen in FIG. 3, the shoe 12 has first and second side walls 18, 20 extending from the spring wear surface 16. A first bushing slot 22 is disposed through the first side wall and a second bushing slot 24 is disposed through the second side wall. Preferably, the first bushing slot is aligned with the second bushing slot.

In the most preferred embodiment, the first bushing slot has a width greater than the second bushing slot. Moreover, as seen in FIG. 3, the first side wall 18 has a first counterbore 26 located at an end of the first bushing slot 22 proximate to the spring wear surface 16 of the shoe. The second side wall 20 also has a second counterbore 28 located at an end of the second bushing slot 24 proximate to the spring wear surface 16 of the shoe. Preferably, the first counterbore 26 is aligned with the second counterbore 28 and the first counterbore 26 has a diameter greater than the diameter of the second counterbore 28.

Also, in the most preferred embodiment of the invention, first and second ramps 30, 32 are positioned on the spring wear surface 16 at opposite sides of the first and second bushing slots 22, 24, as best seen in FIG. 2. Each ramp 30, 32 has a low end 34, 36 flush with the spring wear surface and a raised end 38, 40 protruding above the spring wear surface. Thus, each ramp 30, 32 defines an upwardly inclined travel surface from the low end to the raised end. The raised ends are positioned proximate to the first and second bushing slots and the low ends are positioned distal of the first and second bushing slots. In other words, the low ends are located near the ends of the shoe and the raised ends are located near the center of the shoe.

As shown in FIGS. 3-7, a coil spring 42 is positioned between the first and second side walls 18, 20. The coil spring may be made of any suitable material, preferably a heat-treated spring steel. Such materials are readily available and known to one skilled in the art.

As best seen in FIG. 3, the coil spring 42 has a coiled section 44 to define a passage 46 through its interior. The passage 46 is aligned with the first and second bushing slots. The coil spring 42 also has first and second legs 48, 50 that extend from each end of the coil spring and away from the coiled section.

The coil spring is used to impart a force on the shoe to tension a nearby chain. The force exerted on the shoe is achieved when the spring goes from a relaxed state, as shown in FIGS. 4 and 6, to a stressed state, as shown in FIGS. 5 and 7.

Depending on the number of coils used in the coil spring, various different forces may be obtained. The more coils that are used, the higher the force imparted on the shoe 12. Any number of coils may be used to provide the desired force. In the preferred embodiment, the coil spring 42 has from about two coils to about ten coils, and more preferably about five coils.

Preferably, the coil spring imparts a force on the shoe 12 of no more than 80 lbs (356 N). Using a coil spring which exhibits a force of greater than 80 lbs (356 N) makes it difficult to install the chain tensioner. In the most preferred embodiment, the coil spring imparts a force of from about 45 lbs (133 N) to about 60 lbs (267 N) on the shoe.

Figure 4:
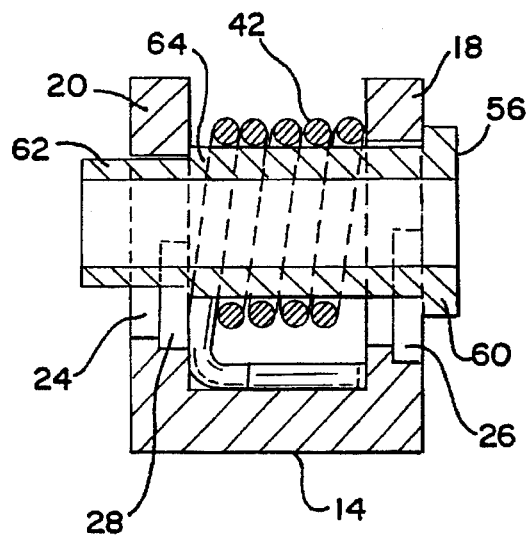
FIG. 4 is a side sectional view of the coil spring chain tensioner of FIG. 1 in an unlocked operation mode.
Figure 5:
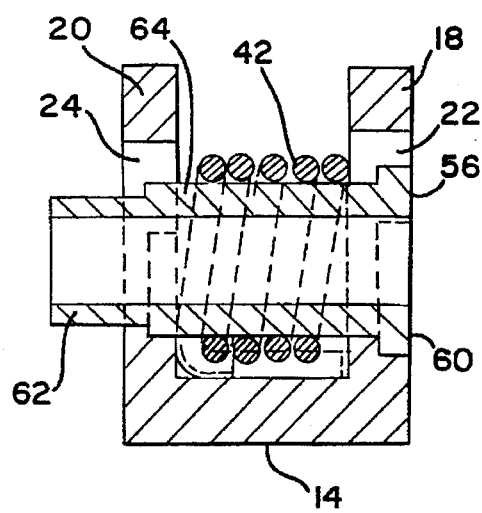
FIG. 5 is a side sectional view of the coil spring chain tensioner of FIG. 1 in a locked installation mode.
Figure 6:
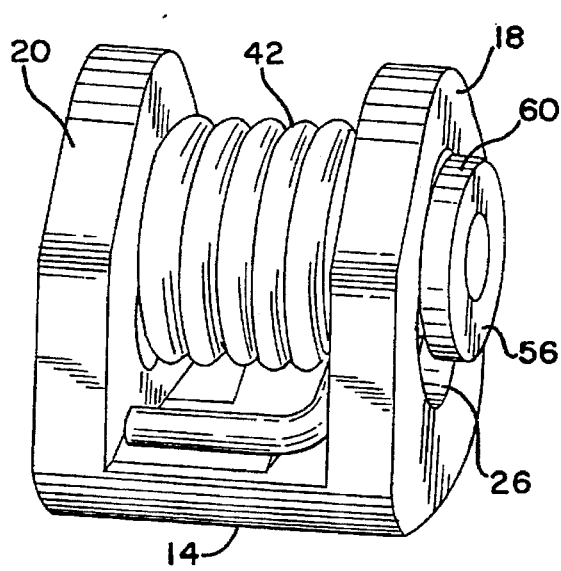
FIG. 6 is a perspective view of the coil spring chain tensioner of FIG. 1 in an unlocked operation mode.
Figure 7:
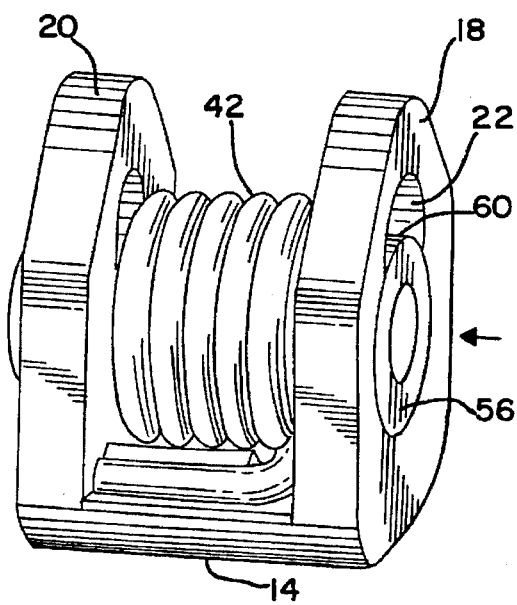
FIG. 7 is a perspective view of the coil spring chain tensioner of FIG. 1 in a locked installation mode.

In the relaxed state shown in FIGS. 4 and 6, the first and second legs form an angle from about 90 to about 120 degrees and more preferably from about 105 to about 115 degrees. In the stressed state shown in FIGS. 5 and 7, the first and second legs form an angle from about 150 to about 180 degrees and more preferably from about 165 to about 180 degrees. In the most preferred embodiment, the first and second legs go from an angle of about 112 degrees in the relaxed state, to an angle of about 176 degrees in the stressed state.

Also in the most preferred embodiment shown in FIG. 3, each end of the first and second legs 48, 50 of the coil spring is bent at an angle of approximately 90 degrees to form first and second feet 52, 54, respectively. The first and second feet are perpendicularly aligned with the first and second side walls 18, 20 such that the first and second feet 52, 54 slidably contact the first and second ramps 30, 32, respectively. This creates a large area of contact between the coil spring and the first and second ramps 30, 32 which helps minimize wear of the first and second ramps. In addition, the structure of the first and second feet 52, 54 in conjunction with the first and second ramps 30, 32 maximizes the amount of travel that the shoe 12 is capable of, for a given amount of spring force.

In this most preferred embodiment, the first and second legs 48, 50 are positioned on opposite sides of the first and second bushing slots 22, 24. When the coil spring 42 is in the stressed state shown in FIGS. 5 and 7, the shoe 12 forces the first foot 52 to slide to the low end 34 of the first ramp 30 and the second foot 54 to slide to the low end 36 of the second ramp 32. On the other hand, when the coil spring is in the relaxed state shown in FIGS. 4 and 6, the first foot slides to the raised end 38 of the first ramp 30 and the second foot slides to the raised end 40 of the second ramp 32.

A bushing 56 is slidably disposed through the first bushing slot 22, the passage 46 of the coil spring 42, and the second bushing slot 24. The bushing may also have a bore 58 for receiving a fastener, such as a bolt. The fastener can be used to fix the bushing, and thus the chain tensioner, in a position close to the chain which needs to be tensioned. With the bushing in a fixed position, the first and second legs 48, 50 of the coil spring contact the spring wear surface 16 and impart a spring force on the shoe 12 in a direction away from the coiled section 44.

The bushing 56 of the most preferred embodiment shown in FIG. 3 has a cylindrical shape with a top flange 60 at one end of the bushing, a bottom end 62 at the other end of the bushing, and a central body 64 positioned between the top flange and the bottom end. The top flange has an outer diameter that is larger than the outer diameter of the central body, which is in turn larger than the outer diameter of the bottom end. The varying outer diameters of these three sections gives the bushing a stepped cross-section.

In the most preferred embodiment, the outer diameter of the top flange 60 is about equal to the diameter of the first counterbore 26. This allows the first counterbore 26 to receive the top flange 60. Furthermore, the outer diameter of the bottom end 62 is about equal to the width of the second bushing slot 24 so that the bottom end 62 is slidably received by the second bushing slot 24.

Also in the most preferred embodiment, the outer diameter of the central body 64 is about equal to the width of the first bushing slot 22 and the diameter of the second counterbore 28. This allows the central body to be slidably received by the first bushing slot and also allows the central body to be received by the second counterbore. In addition, the central body of the bushing has a length about the distance between the first counterbore 26 and the second counterbore 28. This allows the top flange 60 of the bushing to be received within the first counterbore 26 at the same time the central body 64 of the bushing is received within the second counterbore 28.

As described above and illustrated in FIGS. 4-7, the bushing cooperates with the shoe in at least two modes. In a first tensioner installation mode shown in FIGS. 5 and 7, the bushing is received in the first and second counterbores 26, 28. The top of the bushing is flush with the first side wall 18 and the bushing is fixed proximate to the spring wear surface 16. Thus, this mode holds the chain wear surface 14 close to the bushing to permit installation of the chain in an engine.

In a second tensioner operation mode shown in FIGS. 4 and 6, the top flange 60 and central body 64 of the bushing 56 are not received in the respective first and second counterbores 26, 28. Instead, the central body 64 is slidably received in the first bushing slot 22, the bottom end 62 is slidably received in the second bushing slot 24, and the top flange 60 extends out of the first side wall 18.

In this tensioner operation mode, the first and second legs 48, 50 of the coil spring 42 impart a force on the shoe 12 and slidably bias the chain wear surface 14 away from the bushing 56 to tension the chain. The shoe 12 is free to move in a direction toward and away from the chain along a distance dictated by the length of the first and second bushing slots 22, 24. The length of the first and second bushing slots 22, 24 may of course be varied to allow the shoe to travel different distances in tensioning the chain.

Figure 8:
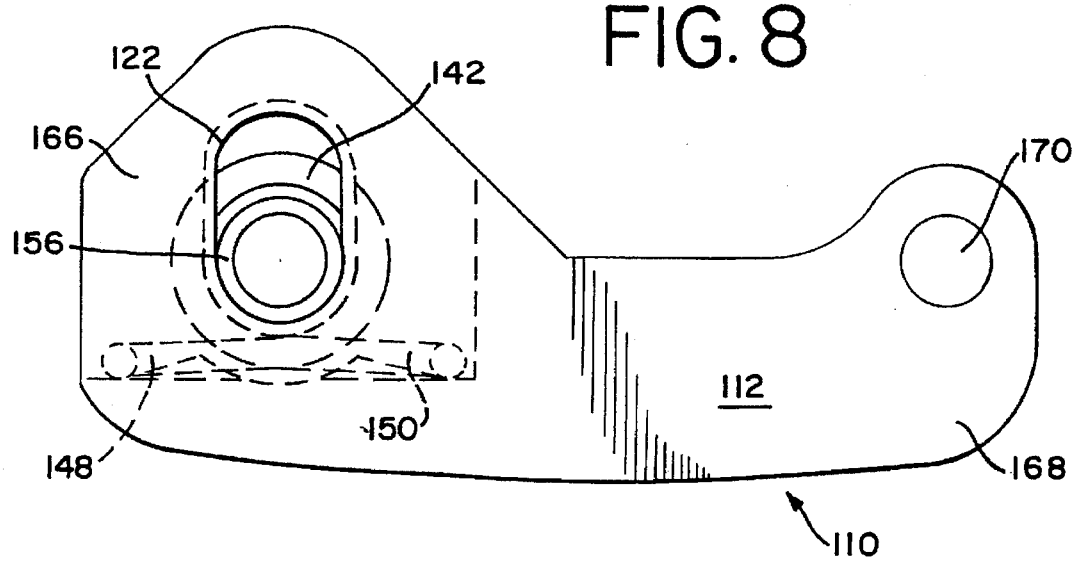
FIG. 8 is a side view of an alternative embodiment of the coil spring chain tensioner of the present invention.
Figure 9:
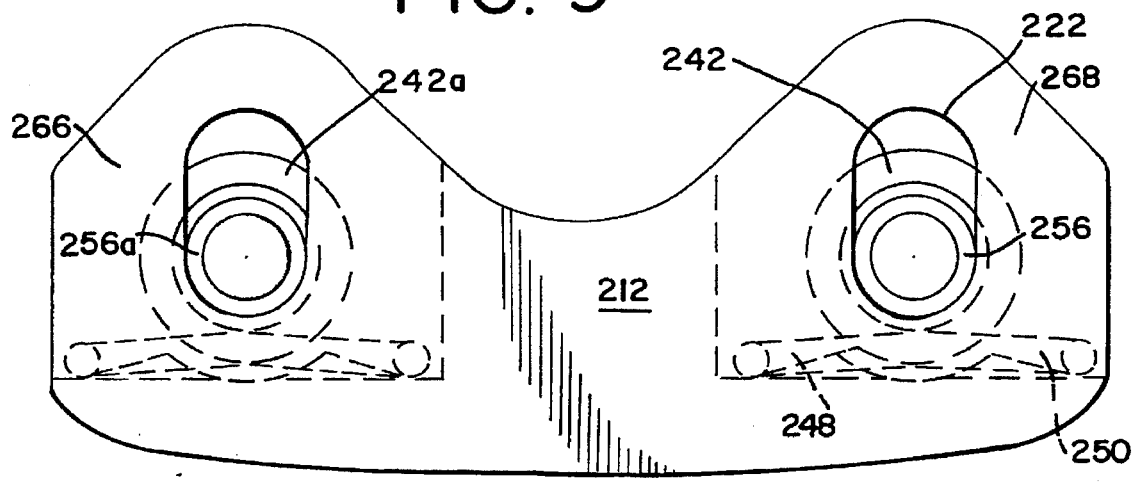
FIG. 9 is a side view of another embodiment of the coil spring chain tensioner of the present invention.
Figure 10:
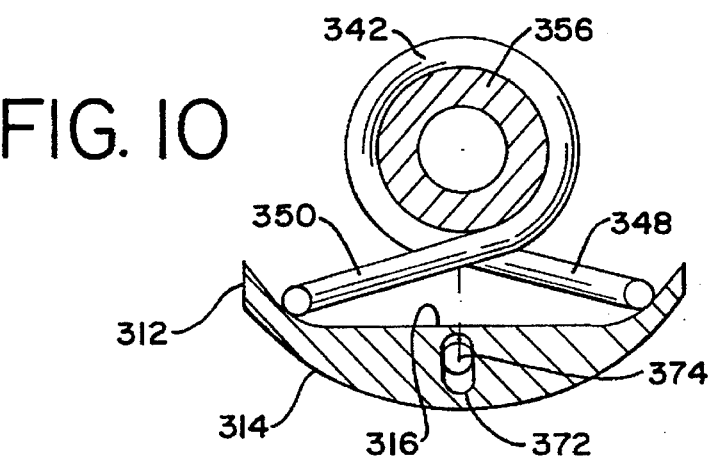
FIG. 10 is a side sectional view of another embodiment of the coil spring chain tensioner of the present invention.

Turning now to other embodiments of the present invention, the reference numerals used for the elements in FIGS. 8-10 correspond to the reference numerals used for similar elements in FIGS. 1-7. The reference numerals used in FIGS. 8-10, however, place a 1, 2, or 3 in front of the corresponding reference numeral used in FIGS. 1-7. For example, the coil spring identified by reference numeral 142 in FIGS. 8 and 9, 242 in FIG. 9 and 342 in FIG. 10, is similar to the coil spring 42 in FIGS. 1-7.

In the embodiment of the present invention shown in FIG. 8, the chain tensioner 110 has an elongated shoe 112 with a first end section 166 and a second end section 168. The first end section 166 is similar to the embodiment shown in FIG. 3. In particular, the first end section 166 of the elongated shoe has first and second side walls extending from the spring wear surface. Similar to the embodiment of FIG. 3, a first bushing slot 122 is disposed through the first side wall and a second bushing slot is disposed through the second side wall. Preferably, the first bushing slot is aligned with the second bushing slot.

The coil spring 142 is positioned between the first and second side walls. The coil spring has a coiled section to define a passage through its interior. The passage is aligned with the first bushing slot and a second blushing slot 122. The coil spring 142 has first and second legs 148, 150 that extend from each end of the coil spring 142 and away from the coiled section.

A bushing 156 is slidably disposed through the first bushing slot 122, the passage of the coil spring, and the second bushing slot. The bushing may also have a bore for receiving a fastener, such as a bolt. The fastener can be used to fix the bushing, and thus the chain tensioner 110, in a position close to the chain that needs to be tensioned. With the bushing in a fixed position, the first and second legs 148, 150 of the coil spring contact the spring wear surface and impart a spring force on the elongated shoe in a direction away from the coiled section.

A bore may be latitudinally disposed at the second end section 168 of the elongated shoe substantially parallel to the bushing and adapted to receive a fixed fastener 170. The fixed fastener can then be used to pivotally mount the second end section to allow the elongated shoe to rotate about the fixed fastener.

FIG. 9 shows a variation of the embodiment shown in FIG. 8, where instead of having a bore disposed in the second end section 268, a third bushing slot 222 and a fourth bushing slot bushing slots 222, 224 are disposed through the second end section 268 of the elongated shoe 212. The third bushing slot is aligned with the fourth bushing slot. In the embodiment shown in FIG. 9, the second end section 268 is identical to the first end section 266.

Just like in the first end section, a second coil spring 242 is positioned between the first and second side walls. Similar to the first coil spring 242A, the second coil spring 242 has a coiled section to define a passage through its interior. The passage of the second coil spring is aligned with the third and fourth bushing slots. The second coil spring has third and fourth legs 248, 250 that extend from each end of the second coil spring and away from the coiled section.

Along with the addition of a second coil spring, a second bushing 256 is slidably disposed through the third bushing slot 222, the passage of the second coil spring, and the fourth bushing slot. Similar to the first bushing 256A, the second bushing 256 may also have a bore for receiving a fastener, such as a bolt. Once again, the fastener can be used to fix the second bushing, and thus the second end section 268, close to the chain that needs to be tensioned. With the second bushing in a fixed position, the third and fourth legs 248, 250 of the second coil spring contact the spring wear surface and impart a spring force on the elongated shoe in a direction away from the coiled section.

In another embodiment of the invention shown in FIG. 10, a slotted shoe 312 without side walls or bushing slots is used as a chain tensioner. Similar to the shoe 12 of the preferred embodiment, the slotted shoe also has a spring wear surface 316 opposite the chain wear surface 314. In addition, the slotted shoe 312 has a vertical guide slot 372 perpendicularly oriented between the spring wear surface and the chain wear surface. The vertical guide slot is adapted to slidably receive a fixed guide pin 374. The guide pin 374 is oriented parallel to the bushing 356.

The guide pin allows the slotted shoe to move only toward and away from the chain to be tensioned. The guide pin thus prevents the slotted shoe from moving in a direction parallel to the direction of the chain. Furthermore, the slotted shoe is restricted by the guide pin to no greater movement toward and away from the chain than the length of the vertical guide slot. In other words, the vertical guide slot performs a similar function as the first and second bushing slots 22, 24 of the preferred embodiment described above.

A coil spring 342 is used to impart a spring torque on the spring wear surface 316 of the slotted shoe. The coil spring has a coiled section to define a passage through its interior. The coil spring also has first and second legs 348, 350 that extend from each end of the coil spring and away from the coiled section.

A bushing 356 is slidably disposed through the passage 346 of the coil spring. The bushing may also have a bore for receiving a fastener, such as a bolt. The fastener can be used to fix the bushing, and thus mount the chain tensioner, in a position close to the chain that needs to be tensioned. With the bushing in a fixed position, the first and second legs of the coil spring contact the spring wear surface and impart a spring force on the slotted shoe in a direction away from the coiled section.

The present invention can be applied with particular advantage to internal combustion engine timing devices having only a short run of chain between adjacent sprockets. Of course, it is readily apparent that the present invention can also be utilized to tension other types of devices.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A chain tensioner comprising:
   a shoe having a chain wear surface and a spring wear surface;
   a coil spring having a coiled section forming a passage, the coil spring also having first and second legs extending away from the coiled section to contact the spring wear surface; and
   a bushing disposed through the passage.

2. The chain tensioner of claim 1 wherein:
   the shoe further comprises a first side wall extending from the spring wear surface and having a first bushing slot, a second side wall opposite the first side wall and extending from the spring wear surface, the second side wall having a second bushing slot aligned with the first bushing slot; and
   the coil spring positioned between the first and second side walls of the shoe with the passage aligned with at least a portion of the first and second bushing slots.

3. The chain tensioner of claim 2 further comprising:
   first and second ramps on the spring wear surface, such that the first leg of the coil spring slidably contacts the first ramp and the second leg of the coil spring slidably contacts the second ramp.

4. The chain tensioner of claim 3 wherein the end of the first leg is bent at an angle of approximately 90 degrees to define a first foot and the end of the second leg is bent at an angle of approximately 90 degrees to define a second foot, the first and second feet perpendicularly aligned with the first and second side walls such that the first foot slidably contacts the first ramp and the second foot slidably contacts the second ramp.

5. The chain tensioner of claim 2 wherein the first bushing slot has a first width and the second bushing slot has a second width different than the first width.

6. The chain tensioner of claim 5 wherein:
   the bushing has a cylindrical shape with a stepped cross-section that includes a top flange, a bottom end, and a central body positioned between the top flange and the bottom end, such that the top flange has an outer diameter D1, the central body has an outer diameter D2, and the bottom end has an outer diameter D3, wherein D1>D2>D3;
   the first bushing slot has a width about equal to D2; and
   the second bushing slot has a width about equal to D3.

7. The tensioner of claim 6 wherein:
   the first side wall has a first counterbore located at an end of the first bushing slot proximate to the spring wear surface of the shoe, the first counterbore having a diameter about equal to D1 to receive the top flange of the bushing; and
   the second side wall has a second counterbore located at an end of the second bushing slot proximate to the spring wear surface of the shoe and aligned with the first counterbore, the second counterbore having a diameter about equal to D2 to receive the central body of the bushing.

8. The chain tensioner of claim 2 wherein:
   the shoe has an elongated shape with a first end section and a second end section; and the first and the second bushing slob are located at the first end section of the shoe.

9. The chain tensioner of claim 8 wherein the second end section is adapted to be pivotally mounted to a fixed fastener.

10. The chain tensioner of claim 8 further comprising:
a third bushing slot on the first side wall at the second end section of the shoe;
a fourth bushing slot on the second side wall at the second end section of the shoe, the fourth bushing slot being aligned with the third bushing slot; and
a second coil spring having a coiled section forming a passage, the second coil spring also having third and fourth legs extending away from the coiled section to contact the spring wear surface; and
a second bushing disposed through the passage of the second coil spring.

11. The chain tensioner of claim 1 further comprising:
a vertical guide slot perpendicularly oriented between the spring wear surface and the chain wear surface, the guide slot adapted to slidably receive a fixed guide pin, the guide pin restricting movement of the shoe; and
wherein the bushing is fixed relative to the guide pin.

12. The chain tensioner of claim 1 wherein:
the legs of the coil spring form an angle from about 90 degrees to about 120 degrees when the coil spring is relaxed; and
the legs of the coil spring form an angle from about 150 degrees to about 180 degrees when the coil spring is stressed.

13. A chain tensioner comprising:
a shoe having a chain wear surface, a spring wear surface, a first side wall extending from the spring wear surface and having a first bushing slot, a second side wall opposite the first side wall and extending from the spring wear surface, the second side wall having a second bushing slot aligned with the first bushing slot;
a coil spring positioned between the first and second side walls, the coil spring having a coiled section forming a passage, the coil spring also having first and second legs extending away from the coiled section to contact the spring wear surface; and
a bushing disposed through the first bushing slot, the passage of the coil spring, and the second bushing slot.

14. The chain tensioner of claim 13 further comprising:
first and second ramps on the spring wear surface; and
a first foot formed at an end of the first leg and slidably contacting the first ramp; and
a second foot formed at an end of the second leg and slidably contacting the second ramp.

15. A chain tensioner comprising:
a shoe having a chain wear surface for imparting tension to a chain, a spring wear surface, a first side wall extending from the spring wear surface and having a first bushing slot, a second side wall opposite the first side wall and extending from the spring wear surface, the second side wall having a second bushing slot aligned with the first bushing slot;
a coil spring positioned between the first and second side walls of the shoe, the coil spring having a coiled section forming a passage, the coil spring also having first and second legs extending away from the coiled section to contact the spring wear surface;
a bushing disposed through the first bushing slot, the passage of the coil spring, and the second bushing slot, the bushing having a cylindrical shape with a stepped cross-section that includes a top flange, a bottom end, and a central body positioned between the top flange and the bottom end, such that the top flange has an outer diameter $D1$, the central body has an outer diameter $D2$, and the bottom end has an outer diameter $D3$, wherein $D1>D2>D3$;

the first bushing slot having a width about equal to $D2$;

the second bushing slot having a width about equal to $D3$;

the first side wall having a first counterbore located at an end of the first bushing slot proximate to the spring wear surface of the shoe, the first counterbore having a diameter about equal to $D1$ to receive the top flange of the bushing;

the second side wall having a second counterbore located at an end of the second bushing slot proximate to the spring wear surface of the shoe, the second counterbore having a diameter about equal to $D2$ to receive the central body of the bushing; and the central body of the bushing having a length about the distance between the first counterbore and the second counterbore such that the top flange of the bushing may be received within the first counterbore concurrently with the central body of the bushing received within the second counterbore.

16. The chain tensioner of claim 15 further comprising:
first and second ramps on the spring wear surface; and
a first foot formed at an end of the first leg distal the coiled section of the coil spring, the first foot having a bend of approximately 90 degrees and perpendicularly aligned with the first and second side walls such that the first foot slidably contacts the first ramp; and
a second foot formed at an end of the second leg distal the coiled section of the coil spring, the second foot having a bend of approximately 90 degrees and perpendicularly aligned with the first and second side walls such that the second foot slidably contacts the second ramp.

* * * * *